March 13, 1934. H. C. BOARDMAN 1,950,393
WELDING EDGES OF SHEET METAL PLATES
Filed June 6, 1932    2 Sheets-Sheet 1
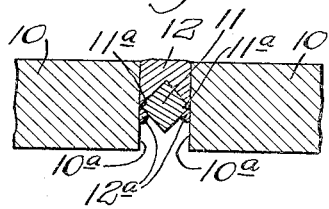
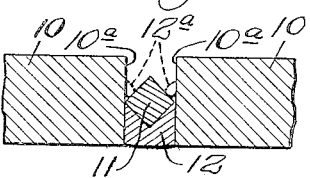
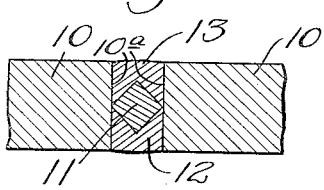
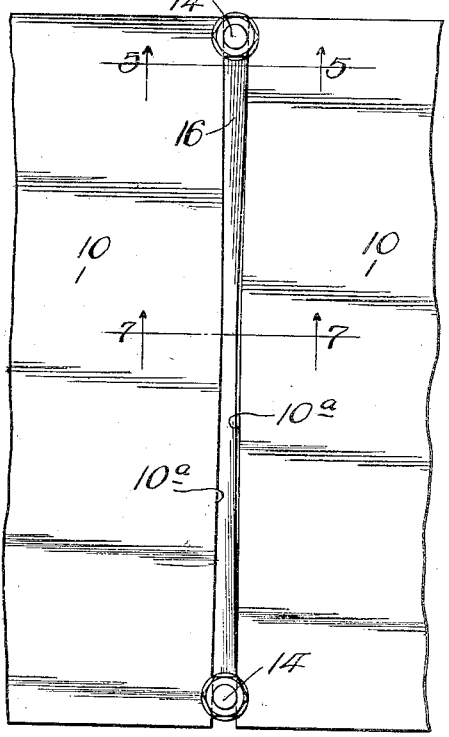
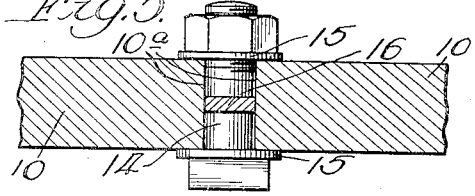
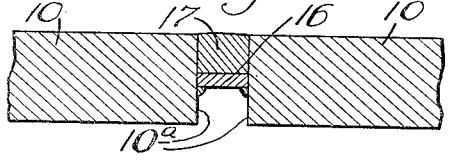
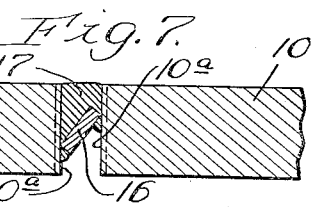
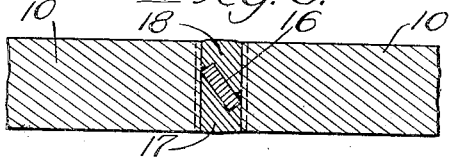
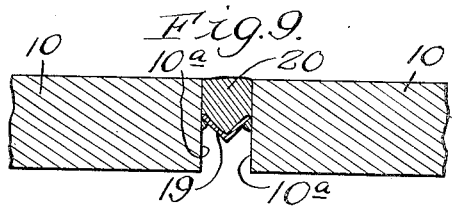
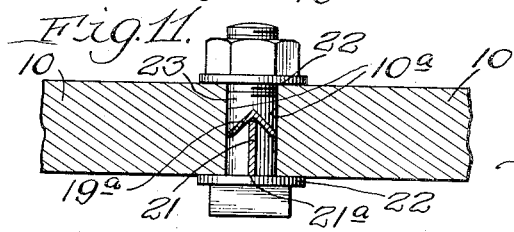
Inventor.
Harry C. Boardman,
By Dynrenforth, Lee, Chritton & Wiles
Attys March 13, 1934.  H. C. BOARDMAN  1,950,393
WELDING EDGES OF SHEET METAL PLATES
Filed June 6, 1932   2 Sheets-Sheet 2
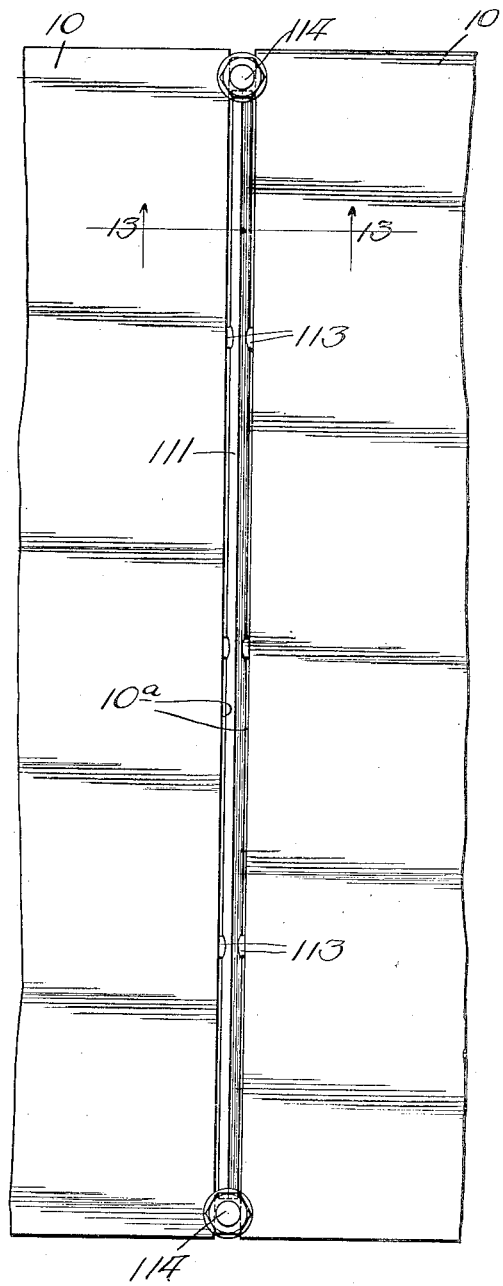
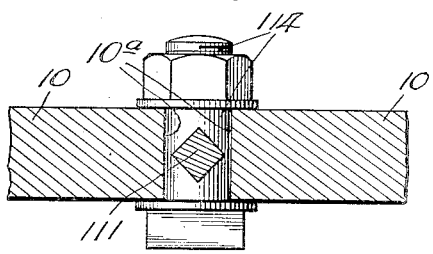
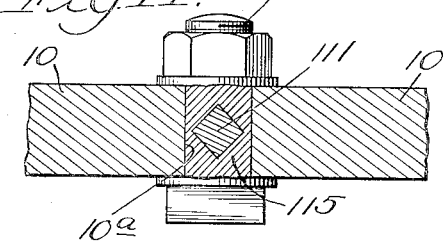
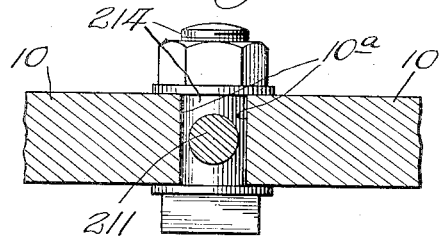
Inventor:
Harry C. Boardman, Patented Mar. 13, 1934

1,950,393

UNITED STATES PATENT OFFICE 1,950,393

WELDING EDGES OF SHEET METAL PLATES

Harry C. Boardman, Chicago, Ill., assignor to Chicago Bridge & Iron Company, Chicago, Ill., a corporation of Illinois Application June 6, 1932, Serial No. 615,666

2 Claims. (Cl. 219—10)

This invention relates to improvements in apparatus and method of welding, and, more especially, the butt-welding of the edges of sheet metal plates by means of the electric arc hereafter referred to as arc welding.

Among the features of my invention is the provision of a dam for use between the edges of the plates to be welded to serve as a foundation for the weld metal, to reduce the amount of welding, and to serve as a permanent part of the joint.

Another feature of the invention is the provision of means for spacing the edges of the adjacent plates for the welding operation. By spacing the plates it is possible to use them as they come from the mill, thus avoiding the necessity of planing or accurately shearing or beveling the edges as considered necessary or advisable when no spacing means is employed. In some forms of my invention, the dam itself may serve as the spacer. In other forms, bolts are employed for this purpose.

Another feature of the invention is the provision of a spacer which can adapt itself to variations in the gap between the plate edges, as hereinafter described.

I am aware of the method of welding shown in Stresau Patent No. 1,812,123, issued on June 30, 1931. My invention, however, contemplates additions, modifications, variations and improvements over the method therein disclosed.

Other features and advantages of my invention will appear more fully as I proceed with my specification.

In those forms of device embodying the features of my invention shown in the accompanying drawings—

Figures 1 to 3 are vertical sectional views showing my invention embodied in a spacer and dam having a substantially square cross-section, the views showing three steps in the welding process; Fig. 4 is a top plan view showing a spacer and dam in the form of a flat bar with sufficient flexibility to permit the same to twist to adapt itself to variations in the gap between adjacent edges of metal plates; Fig. 5 is a view taken as indicated by the line 5—5 of Fig. 4; Fig. 6 is a view similar to Fig. 5 showing the bolt removed and the edges of the plates partly welded; Fig. 7 is a view similar to Fig. 6 taken on the line 7 of Fig. 4; Fig. 8 is a view similar to Fig. 7 taken at another place; Fig. 9 is a vertical sectional view showing the use of an angle iron as a spacer and dam; Fig. 10 is a view similar to Fig. 9 showing the flanges of the angle iron somewhat compressed where the gap between the plates is smaller; Fig. 11 is a view similar to Fig. 9 showing the use of a bar set on edge, together with bolts to force and hold the angle iron in place; Fig. 12 is a view similar to Fig. 4 showing a modified form; Fig. 13 is a view taken as indicated by the line 13—13 of Fig. 12; Fig. 14 is a view similar to Fig. 13 showing the welding completed; and Fig. 15 is a view similar to Fig. 13 showing a modified form.

As shown in the drawings, 10, 10 in all cases indicate metal plates, the adjacent edges $10^a$, $10^a$ of which are to be butt-welded. In the form shown in Figs. 1 to 3, inclusive, I use a bar 11 substantially square in cross-section and, consequently, having relatively sharp edges $11^a$, $11^a$ on opposite corners thereof. This bar is placed between the plates with its sharp edges $11^a$, $11^a$ in contact with the edges $10^a$, $10^a$ of the plates and is preferably located substantially midway between the two sides of the plates.

I then deposit fused welding metal 12 between the plates on one side of the bar 11, the latter serving as a dam for the welding metal and also properly spacing the edges of the plates. This welding metal fuses to the edges $10^a$ entirely up to the sharp edges $11^a$ of the bar. Any excess welding metal that goes beyond the bar, as indicated by $12^a$, may then be cut away, as shown in Fig. 2, where the plates are turned over. The gap between the plates on the other side of the bar is then filled with welding metal 13, as shown in Fig. 3, to complete the weld. Since the edges $11^a$ of the spacer in contact with the edges $10^a$ of the plates are relatively sharp, it will be seen that substantially no surface of the faces $10^a$ are protected from the welding metal. Consequently, the welding metal 12 and 13 covers substantially the entire faces of the edges $10^a$ of the plates fusing with the same, and also fuses with the bar 11. There is thus effected a firm fusion or welding between the adjacent edges of the plates. Because of this construction, it is not necessary to cut away the bar 11 during the welding process. Portions of it, however, may be, and naturally are, more or less destroyed in the welding process. Substantial portions of it, however, may remain intact without weakening the weld, and thus become a permanent part of the joint.

In Figs. 4 to 8, inclusive, I have shown the use of a flat bar as a spacer and dam, said bar having sufficient flexibility to permit the same to twist to adapt itself to variations in the gap between adjacent edges of the plates. I have also shown the use of bolts 14 between the plates with washers 15, 15 bearing against the sides of the plates to hold the edges to be welded in registry. There may be any desired number of these bolts 14 with flat bars 16 between the same. In this case, the bar 16 is thin enough so that its edges are relatively sharp compared to the thickness of the plates. Consequently, an undue amount of the surface of the edges 10ª of the plates will not be covered by the bar. Besides this, it is to be noted that wherever the bar twists, even a small amount, there will then be relatively sharp edges in contact with the edges of the plates. Only where the bar is absolutely flat, as shown in Figs. 5 and 6, will there be substantially more than a line contact between the bar and the edge of the plate. As shown in Fig. 7, the bar 16 may twist or turn on its edge a certain amount in order to adapt itself to the gap where it is somewhat narrowed, owing to variations in the edges 10ª of the plates.

After the bar 16 and bolts 15 are in place, welding metal 17 is fused first on one side of the bar and then on the other, as indicated by 18, substantially as described in connection with Figs. 1 to 3 to complete the weld. It is to be understood that the bolts 14 are removed after sufficient welding has been performed to hold the plates in the proper position without such bolts.

In Figs. 9 and 10, I have shown the use of an angle iron 19 as a spacer and dam. With such a member, the flanges thereof may be somewhat bent or sprung together, as indicated in Fig. 10, to adapt the same to variations in the gap. In Fig. 9, I have shown the welding completed on only one side, as indicated by 20. In Fig. 10, the weld is completed on the other side, as indicated by 21, thus completing the weld.

The construction shown in Fig. 11 is somewhat similar to that shown in Figs. 9 and 10, except that I employ in connection with the angle iron 19ª a bar 21 set on edge and lying in the angle of the angle iron. The outer edge of this bar, as indicated by 21ª is adapted to be engaged by washers 22 on bolts 23 arranged similarly to the bolts 14 of Fig. 5. When these bolts are tightened, the washers 22 press the bar 21 against the angle iron, thus forcing it into and holding it in proper position between the edges 10ª of the plates 10. The weld may then be formed on both sides of the angle iron. If desired, the angle iron 19ª may be tacked in place with small welds and the bolts and bar 21, if desired, removed before the weld is completed.

It is to be noted that wherever bolts such as 14 or 23 are used, said bolts serve not only to hold the plates in registry, but also may serve to space the plates if the diameters of the bolts are made the proper size for this purpose. It is to be noted, also, that in all the forms shown, the bar, angle or other member used as a spacer and dam may be tacked in place by small welds to give it a temporary support as necessary until the final welding is completed.

In the form shown in Figs. 12, 13 and 14, a square bar 111 is used but small enough so that its opposite edges are not in contact with the edges 10ª of the plates 10. Preferably a space of about ⅛" is left. This space is provided as it has been found that it is easier to get the welding metal to go up to the edges of the bar if they are not in contact with the edges of the plates. When the bar does not serve as a spacer, as here shown, the plates may be spaced by using the bolts 114 similar to the bolts 14 shown in Fig. 5. In this form of construction, the bar 111 may be held in place by preliminary spot welding or tacking, as indicated by 113. The final welding is indicated in Fig. 14 by 115.

In Fig. 15 a modification is suggested involving the use of a round bar instead of a square bar, as shown in Figs. 12 to 14, inclusive. Here, again, the bar 211 is small enough so that it does not contact the edges 10ª of the plates 10; and bolts 214 are used to secure them properly.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in the invention as broadly as permissible, in view of the prior art.

What I regard as new, and desire to secure by Letters Patent, is:

1. The method of arc butt-welding the edges of metal plates which comprises providing a bar with relatively sharp edges on opposite sides thereof, placing said bar between the plates with its sharp edges adjacent the edges of the plates, and welding the edges of the plates on each side of the bar, said bar serving as a dam for the welding metal.

2. The method of arc butt-welding the edges of metal plates which comprises providing a bar with relatively sharp edges on opposite sides thereof, placing said bar between the plates with its sharp edges in contact with the edges of the plates to space the same from each other, and welding the edges of the plates on each side of the bar, said bar serving as a dam for the welding metal.

HARRY C. BOARDMAN.